United States Patent [19]

Parsons

[11] 4,106,168
[45] Aug. 15, 1978

[54] METHOD AND APPARATUS FOR ASSEMBLING A BALL CAGE OF THE TYPE UTILIZED IN A MOTION TRANSMITTING REMOTE CONTROL ASSEMBLY

[75] Inventor: William H. Parsons, Lansdale, Pa.

[73] Assignee: Teleflex Incorporated, Limerick, Pa.

[21] Appl. No.: 670,750

[22] Filed: Mar. 26, 1976

[51] Int. Cl.² .................. B21D 53/12; B21H 1/12; B23P 21/00
[52] U.S. Cl. .............. 29/148.4 C; 29/33 K; 29/33 S; 29/564.1; 29/724
[58] Field of Search ............ 29/148.4 R, 148.4 A, 29/148.4 C, 724, 33 K, 33 S, 564.1, 564.2, 565; 113/117; 53/184, 74; 308/6 B

[56] References Cited

U.S. PATENT DOCUMENTS

| | | | |
|---|---|---|---|
| 1,481,866 | 1/1924 | Heist | 53/184 X |
| 2,751,664 | 6/1956 | Arnit | 29/148.4 C |
| 2,812,222 | 11/1957 | Gussack | 29/148.4 C X |
| 3,397,505 | 8/1968 | Critchell | 53/74 |
| 3,831,249 | 8/1974 | Perlman et al. | 29/724 |

FOREIGN PATENT DOCUMENTS 1,135,406 8/1962 Fed. Rep. of Germany .......... 29/148.4

Primary Examiner—Othell M. Simpson
Attorney, Agent, or Firm—McGlynn and Milton

[57] ABSTRACT

A ball cage retainer of the type including a pair of coextensive strips having annular pocket portions defined by truncated angular flanges to define ball retaining pockets for rotatably retaining balls between the strips with the strips spot welded together and a method and apparatus for assembling such a ball cage. The ball cage is utilized in a conduit of a motion transmitting remote control assembly for facilitating the movement of a motion transmitting core element within the conduit. The cage is assembled by indexing a pair of metal ribbon-like strips successively through a plurality of stations by two sets of fixed and movable clamping assemblies. The pocket portions, and alignment notches adjacent the pocket portions, are simultaneously formed in each of the strips at a first station as the strips pass through the first station in parallel relationship to one another. One of the strips passes through a second station and balls are placed in each of the pocket portions of that strip. Thereafter the two strips are guided into coextensive abutting relationship with the coacting pocket portions defining the ball retaining pockets surrounding the balls. With the strips in abutting relationship with one another they pass through a third station where an aligning member engages the alignment notches in the two strips for longitudinally aligning the strips along the length of the strips having the ball retaining pocket therein adjacent which the strips are to be secured together by a welder which engages the strips for spot welding the strips together while the strips are maintained aligned with one another by the aligning member.

41 Claims, 17 Drawing Figures

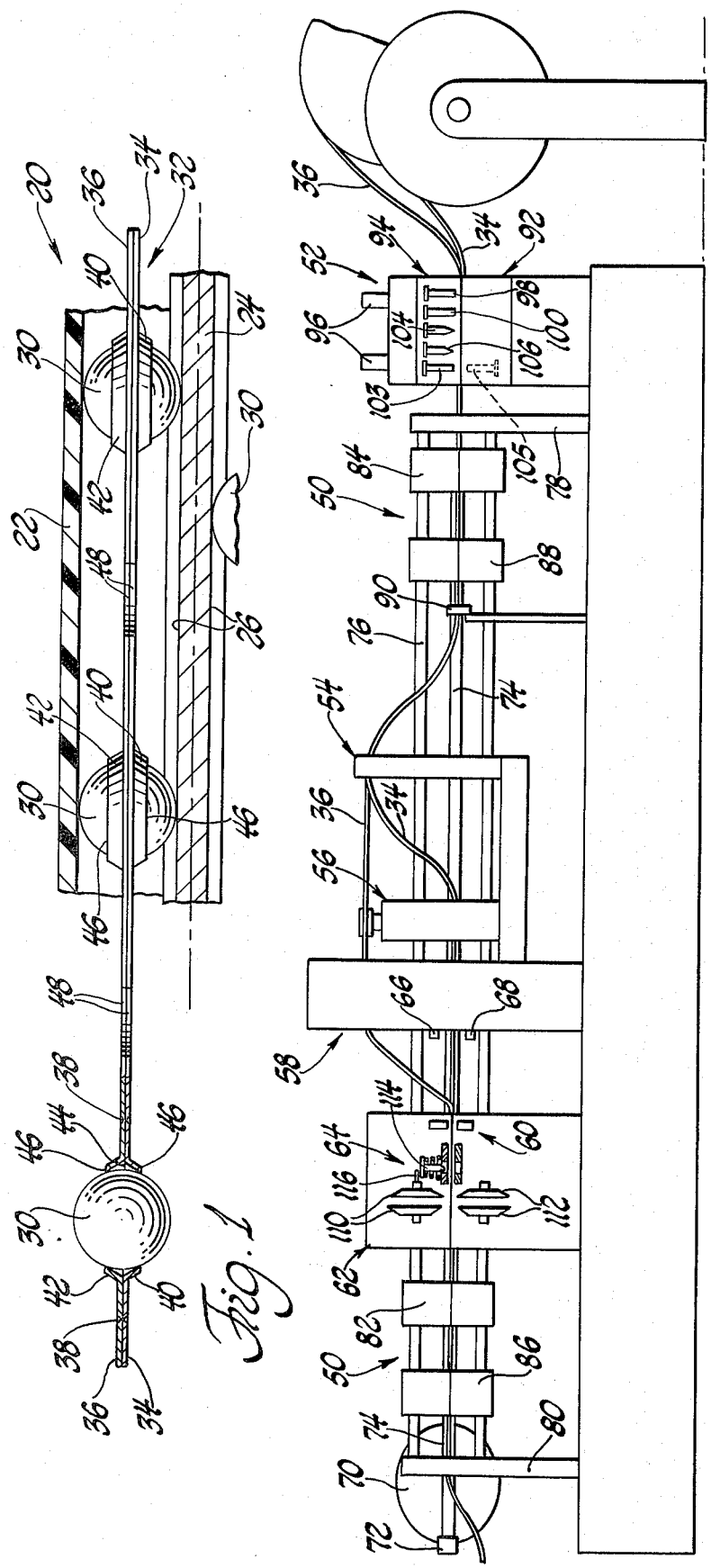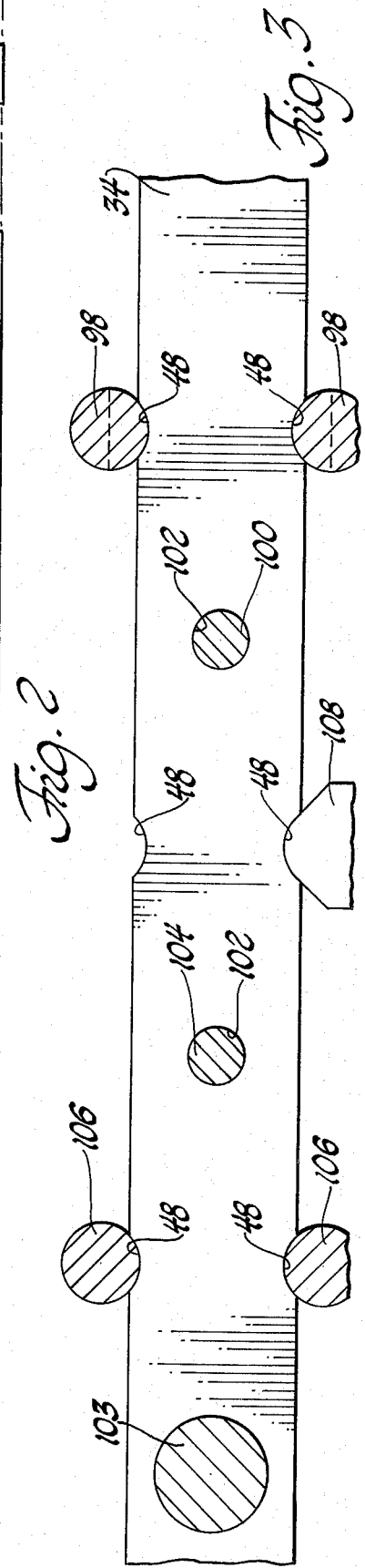

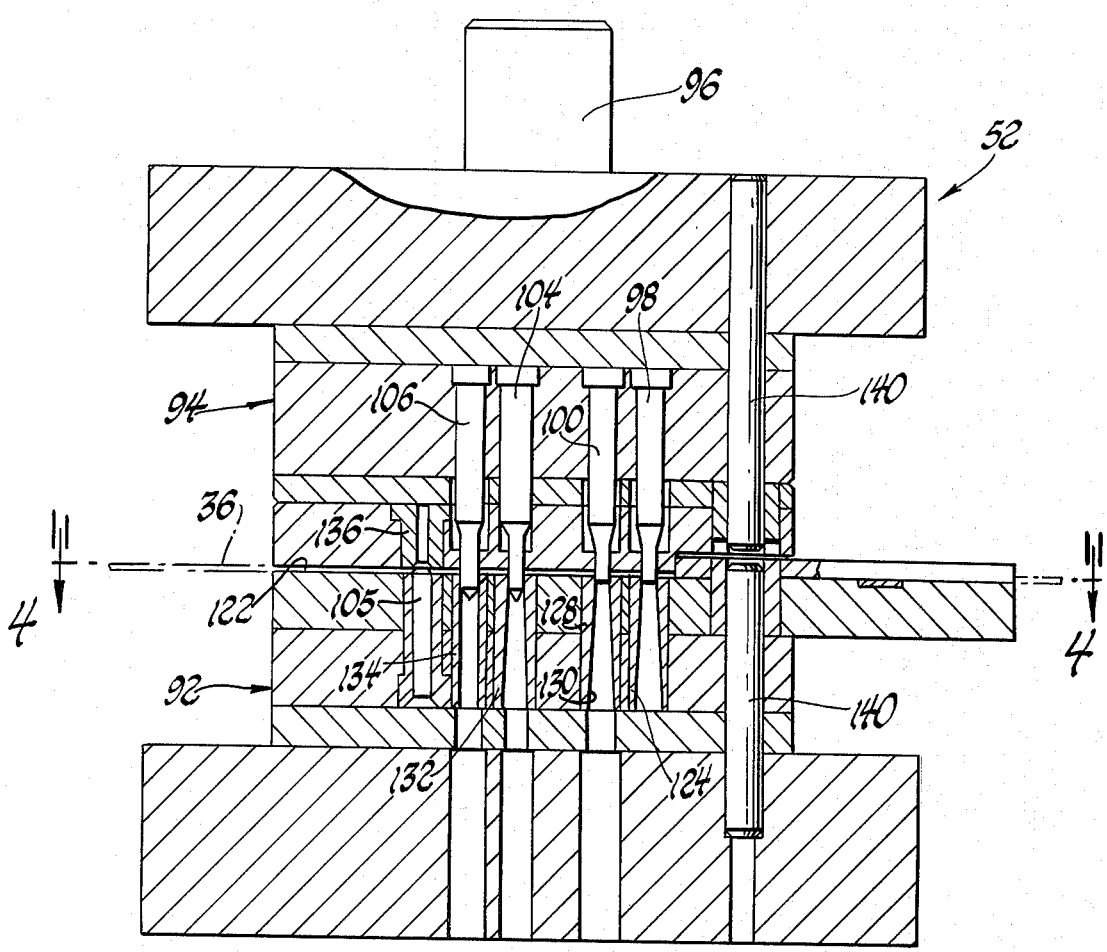
Fig. 6
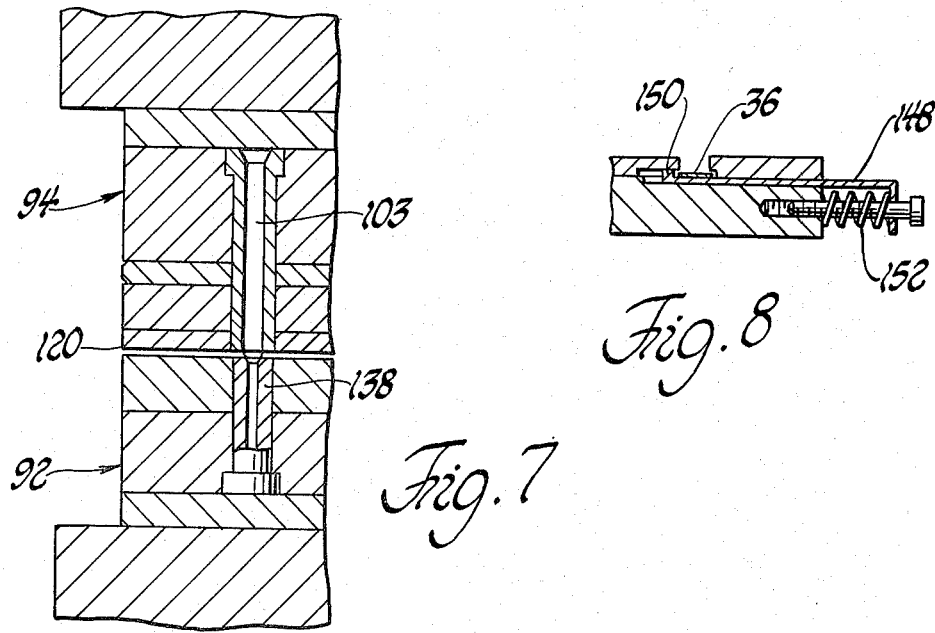
Fig. 7
Fig. 8

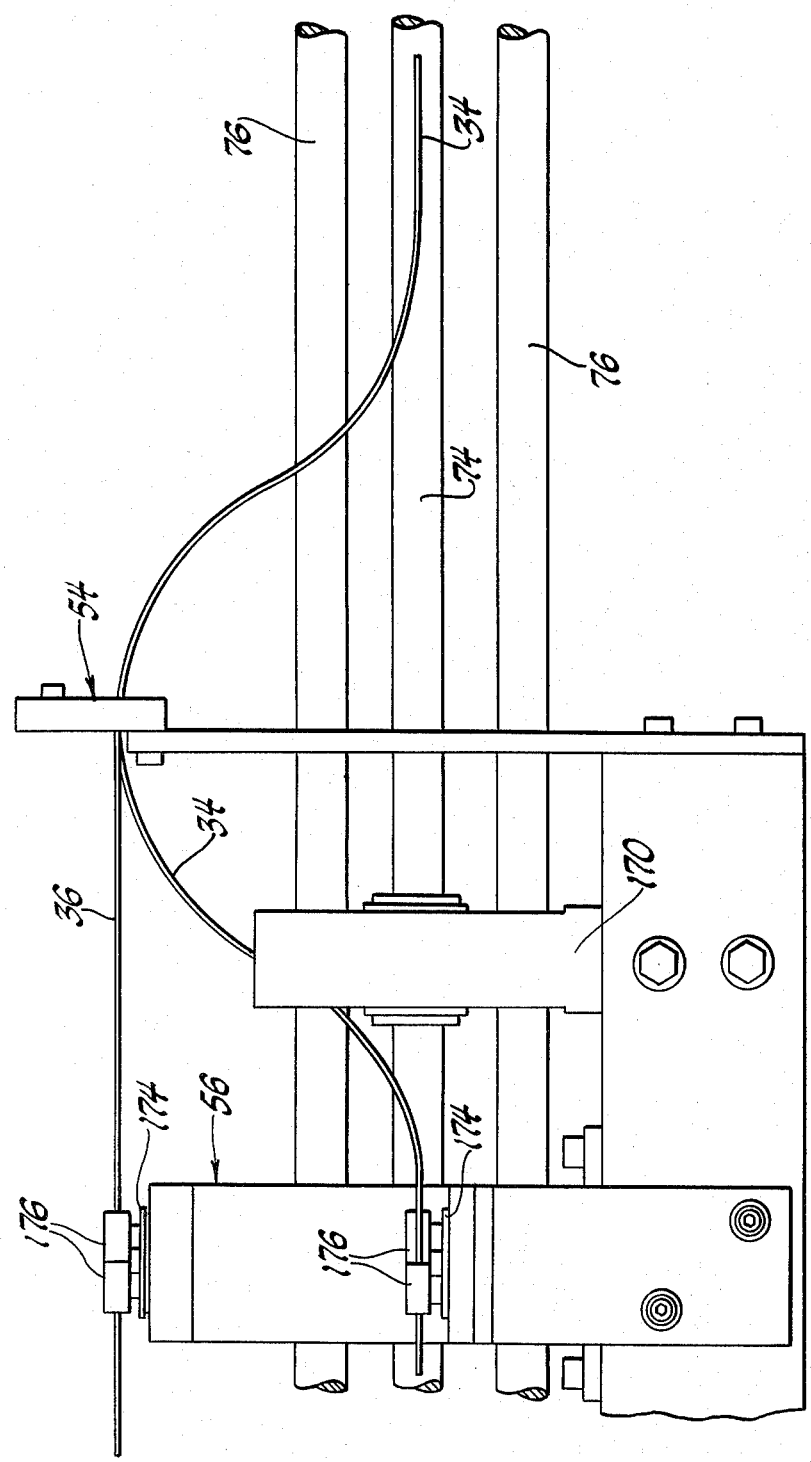

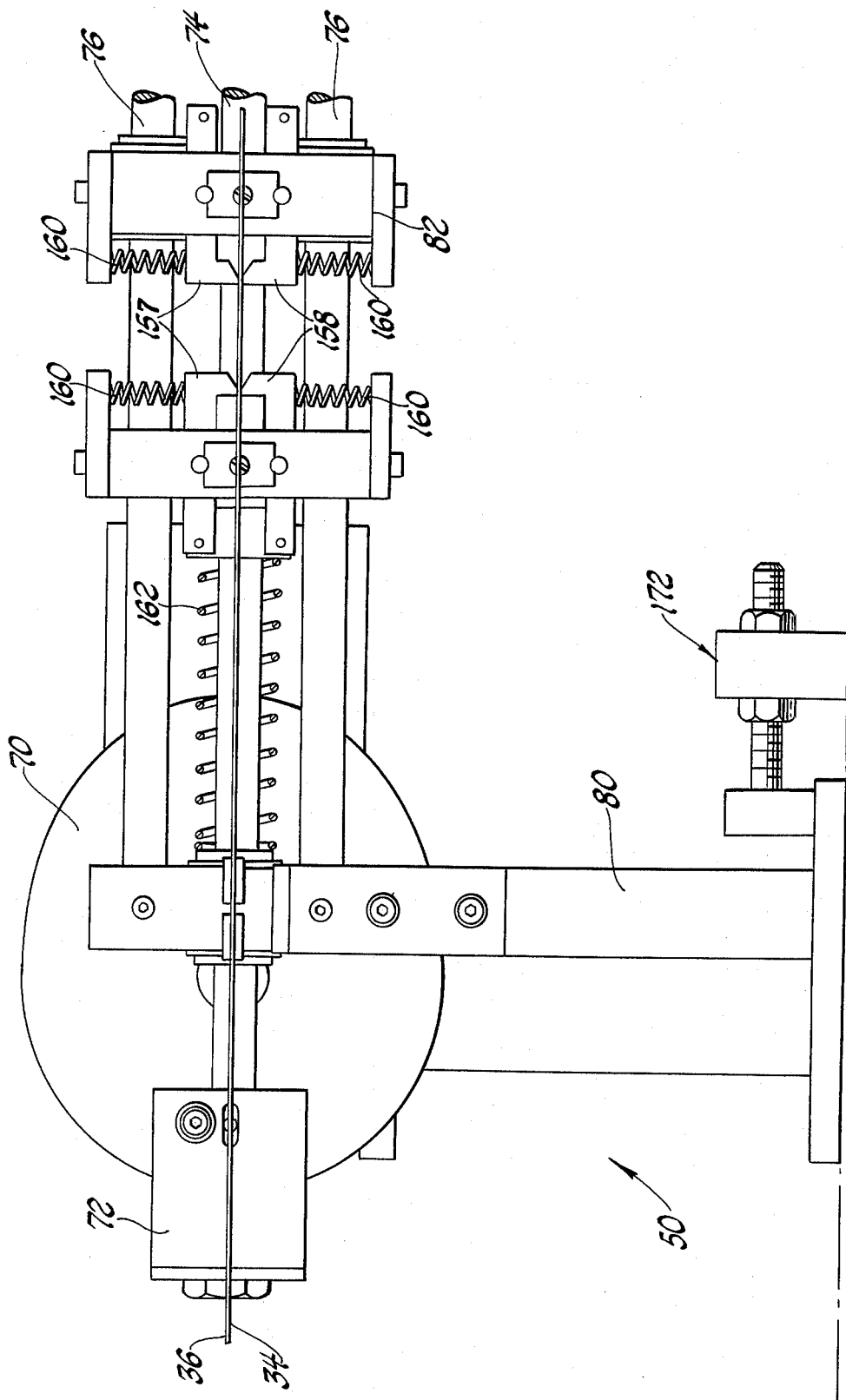

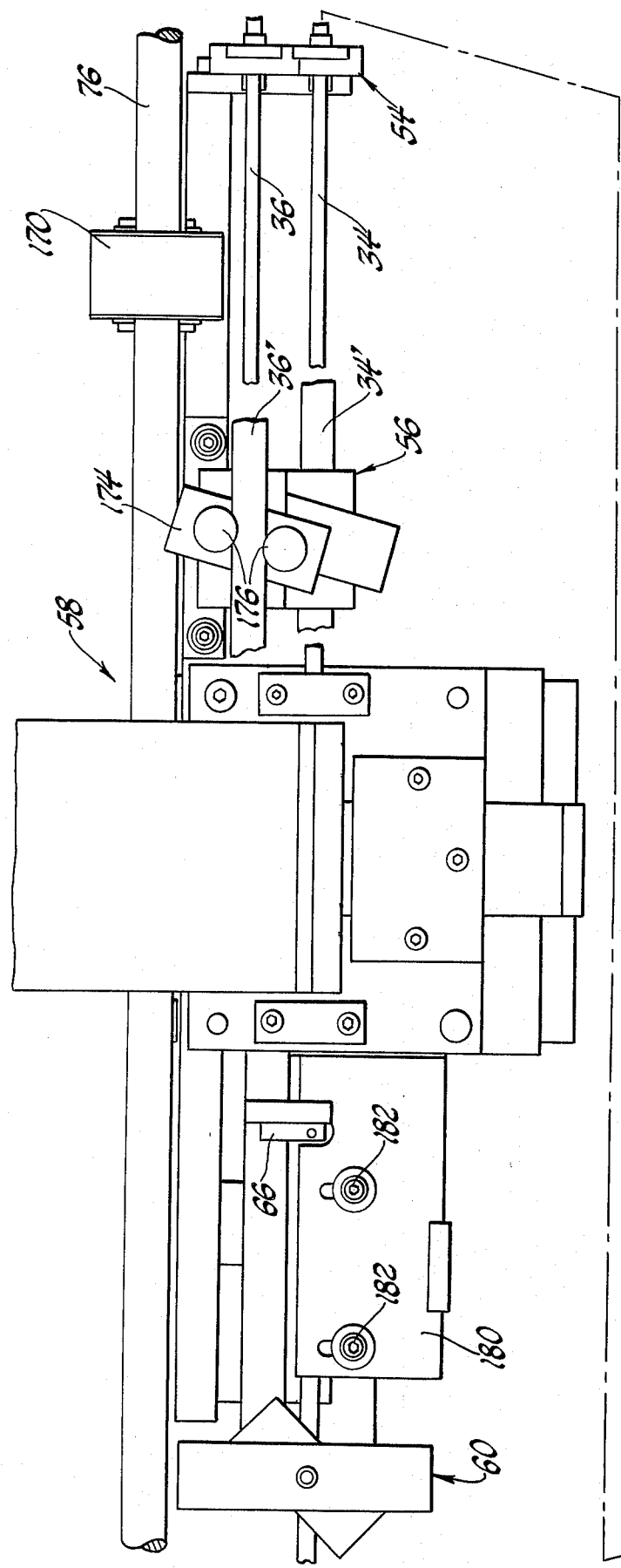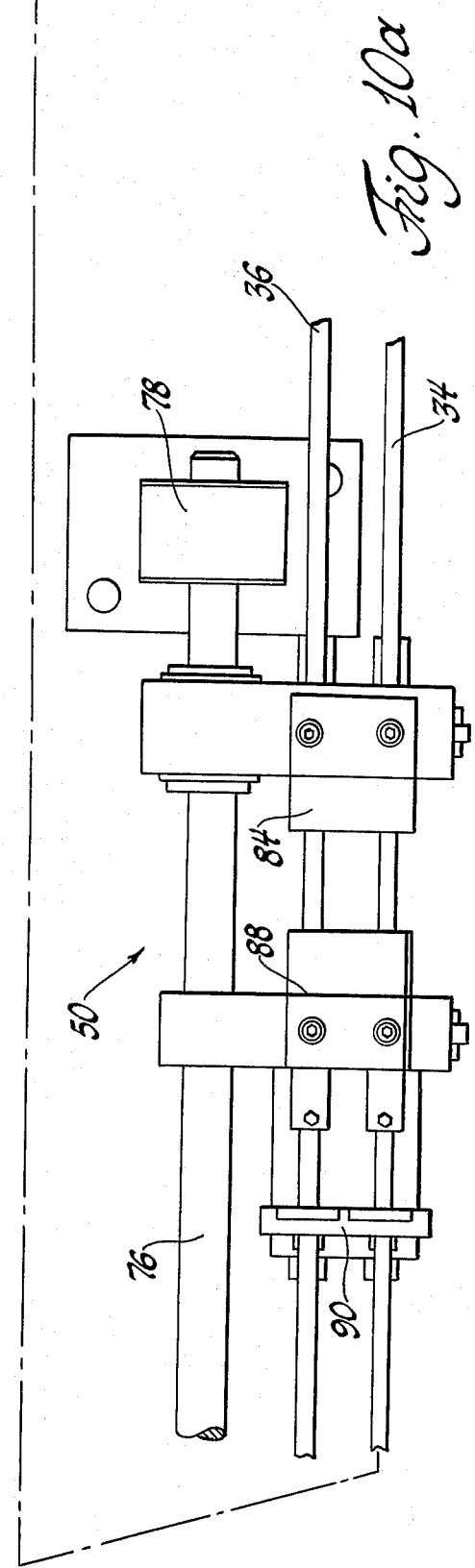
Fig. 10a

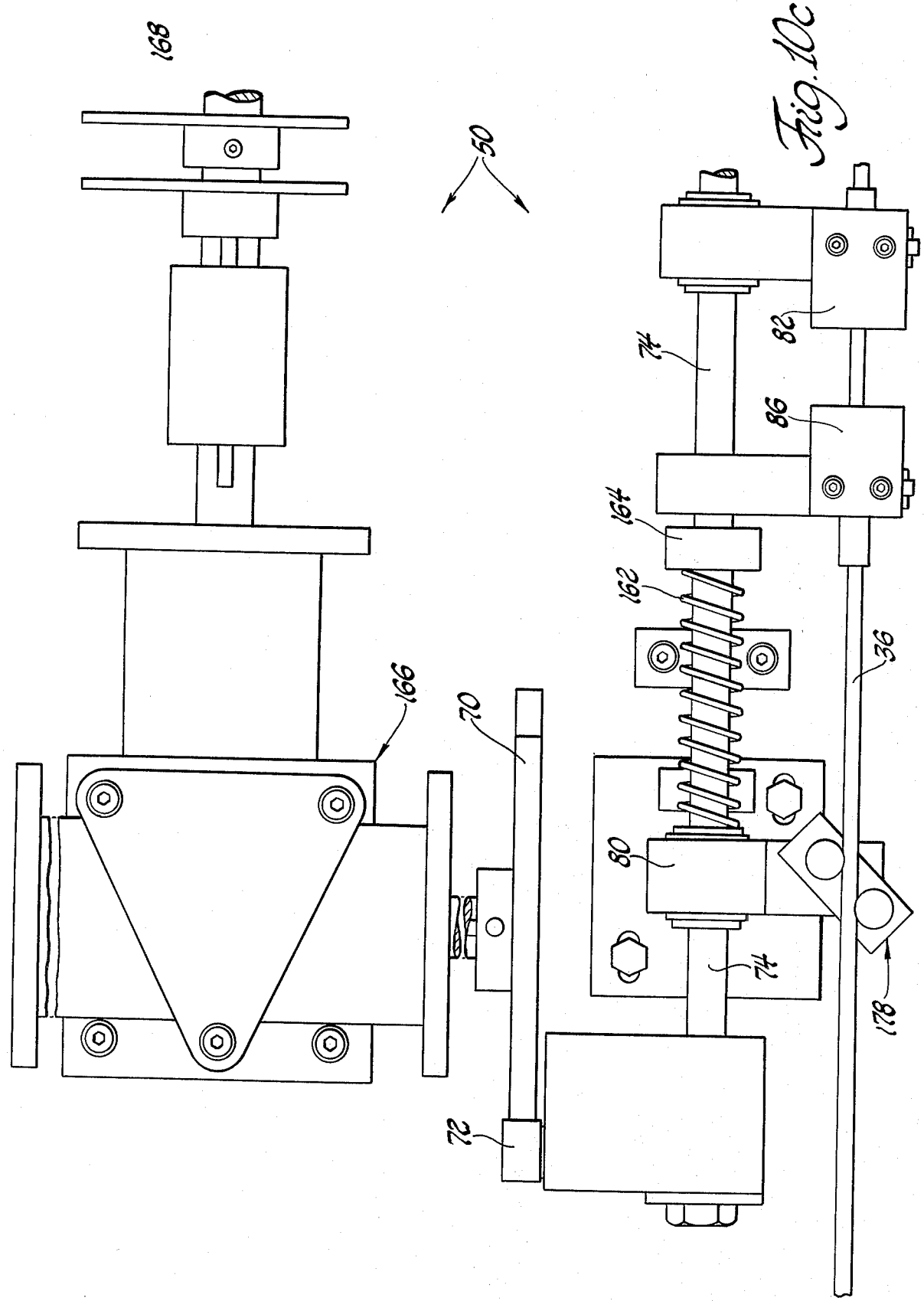

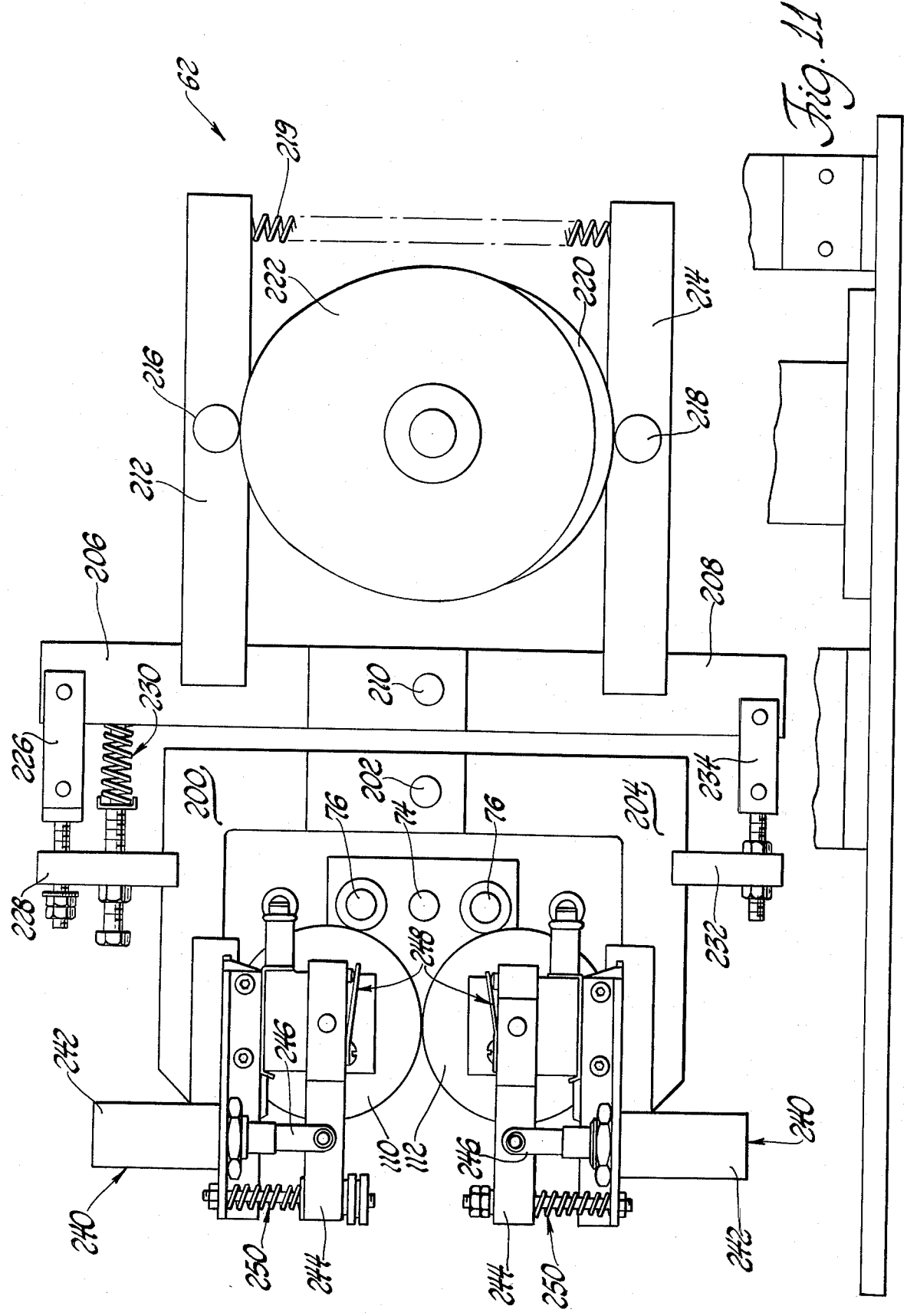

METHOD AND APPARATUS FOR ASSEMBLING A BALL CAGE OF THE TYPE UTILIZED IN A MOTION TRANSMITTING REMOTE CONTROL ASSEMBLY

This invention relates to a motion transmitting remote control assembly of the type for transmitting motion in a curved path by a flexible motion transmitting core element disposed within a conduit for longitudinal movement within the conduit and with a plurality of roller elements disposed within the conduit and engaging the core element for facilitating longitudinal movement of the core element relative to the conduit and, more specifically, to a retainer cage means interconnecting a plurality of the roller elements and including first and second coextensive and abutting ribbon-like strips secured together and defining pocket portions in each strip which coact to define a retaining pocket between the strips for each of the roller elements to rotatably retain one of the roller elements in each of the pockets. This invention relates to the cage retainer comprising the two strips as well as to a method and apparatus for assembling such a cage retainer.

Such cage retainers are assembled by forming pocket portions in ribbon-like metal strips whereby when the strips are placed in abutting relationship with one another, the pocket portions coact to define retaining pockets for the roller elements. Usually each of the strips are continuous or of very long lengths which, after being secured together, are severed into the desired lengths for particular remote control assemblies. Even though the pocket portions in the respective strips are formed at equal distances along the respective strips and the pocket portions are initially aligned with one another at the lead ends of the strips, the pocket portions in the two strips will become longitudinally misaligned further along the strips because of a stack-up of tolerances which, in turn, causes friction loads on the roller elements because the retaining pockets are not properly defined to allow free uninhibited rotation of the roller elements.

The subject invention solves this problem by providing a cage retainer and a method and apparatus for assembling same wherein the cage retainer includes first and second coextensive abutting ribbon-like strips secured together and defining pocket portions in each strip which coact to define a retaining pocket between the strips to rotatably retain one of the roller elements in each of the pockets with each of the strips including alignment means formed therein at longitudinally spaced positions along the strips whereby, as the two ribbon-like strips are assembled and secured together at spaced positions therealong and adjacent each of the retaining pockets, they are longitudinally aligned with one another along the lengths thereof having the ball retaining pocket adjacent which the strips are secured together prior to and during the securing of the strips together by an aligning member engaging the alignment means of the two strips.

Other advantages of the present invention will be readily appreciated as the same becomes better understood by reference to the following detailed description when considered in connection with the accompanying drawings wherein:

FIG. 1 is an enlarged fragmentary cross-sectional view of a motion transmitting remote control assembly including a cage retainer assembled in accordance with the subject invention;

FIG. 2 is a schematic elevational view of an apparatus for assembling the cage retainer shown in FIG. 1;

FIG. 3 is an enlarged plan view of one of the strips forming the cage retainer in the forming means and showing various components of the forming means in cross section;

FIG. 6 is a cross-sectional view of the upper and lower die components of the forming means and taken substantially along line 6—6 of FIG. 4;

FIG. 7 is a fragmentary cross-sectional view of the upper and lower die components and taken substantially along line 7—7 of FIG. 4;

FIG. 8 is a fragmentary cross-sectional view taken substantially along line 8—8 of FIG. 4;

Figure 9A:
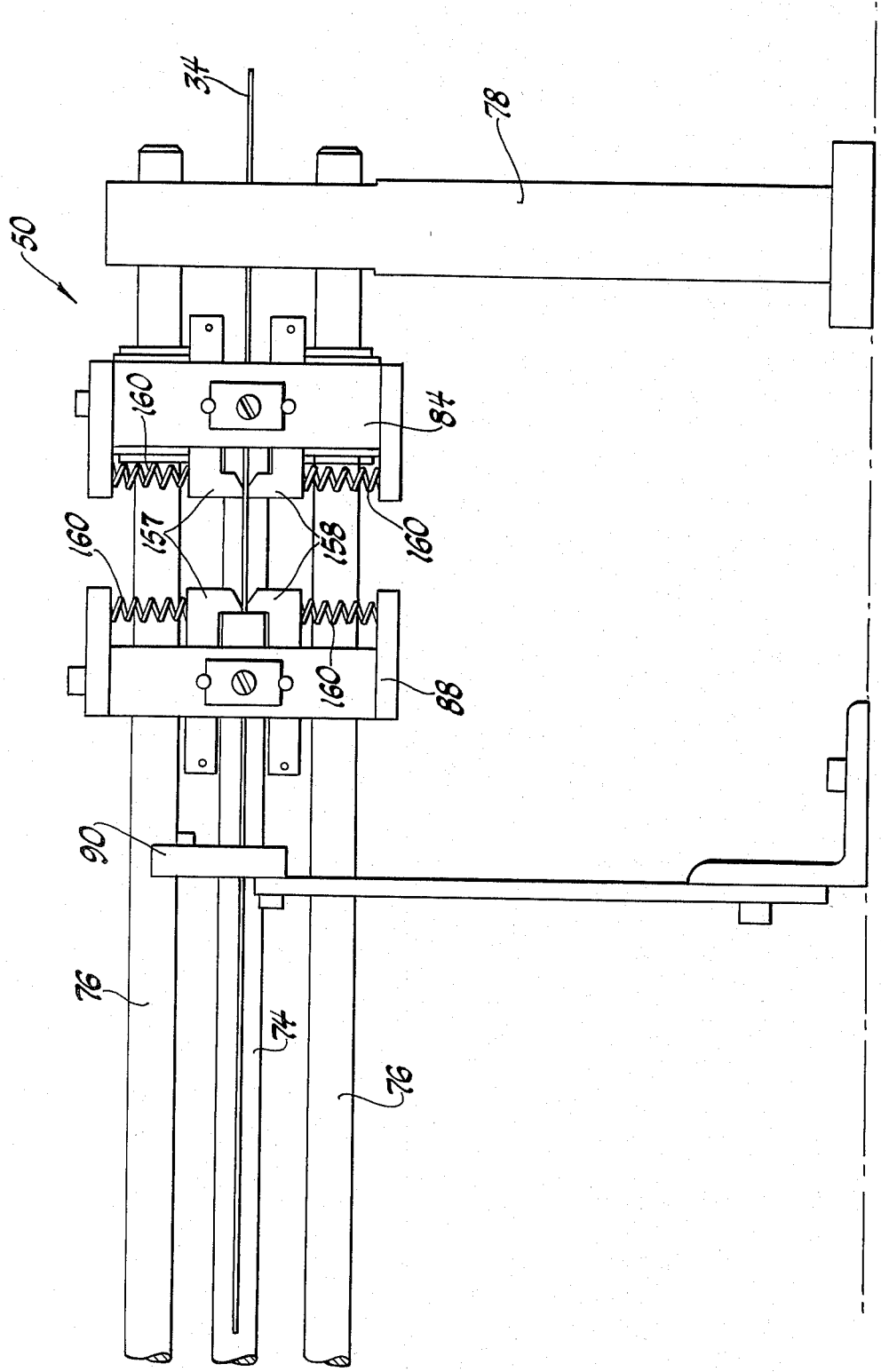
Figure 9C:
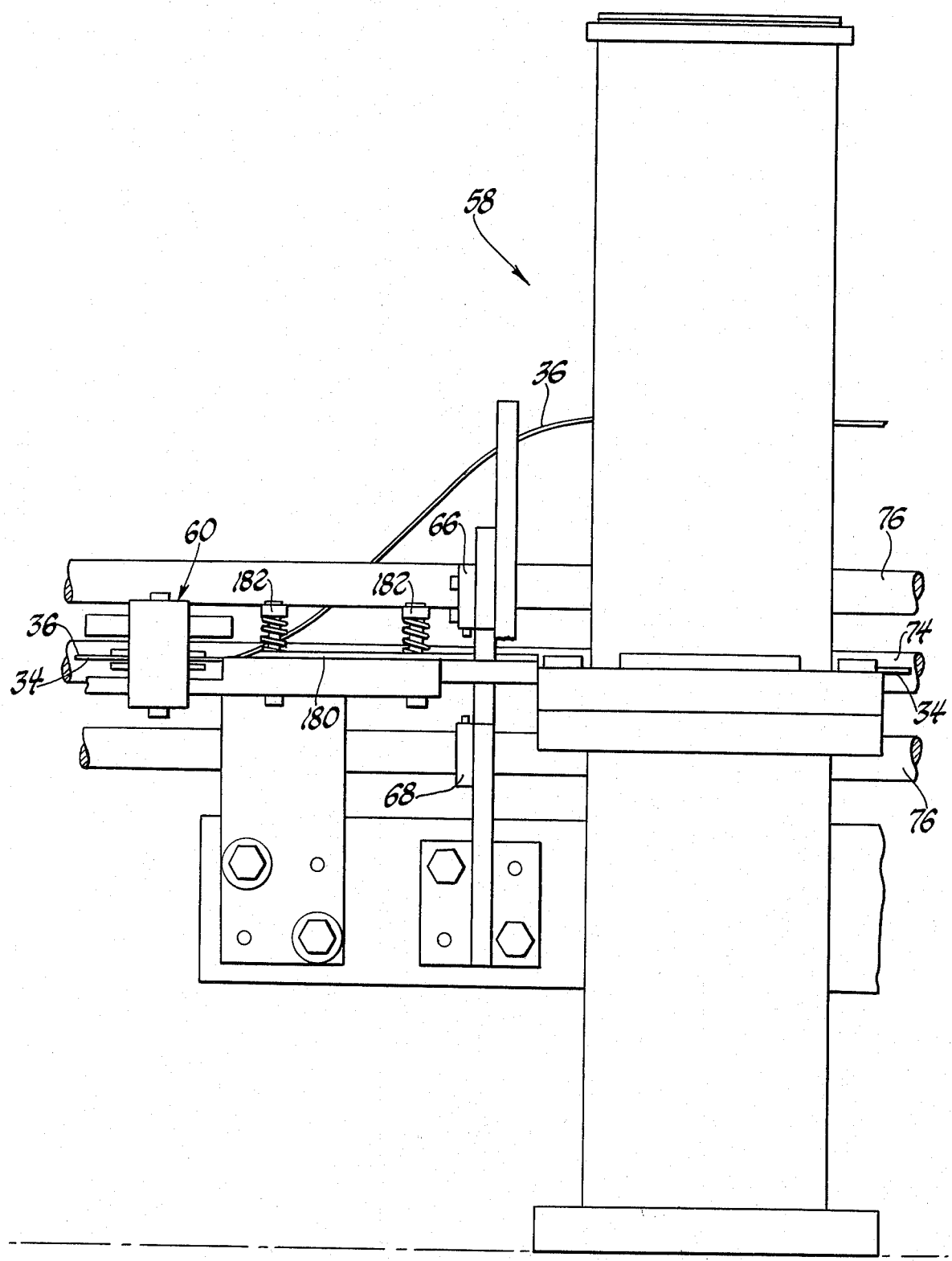
Figure 9D:
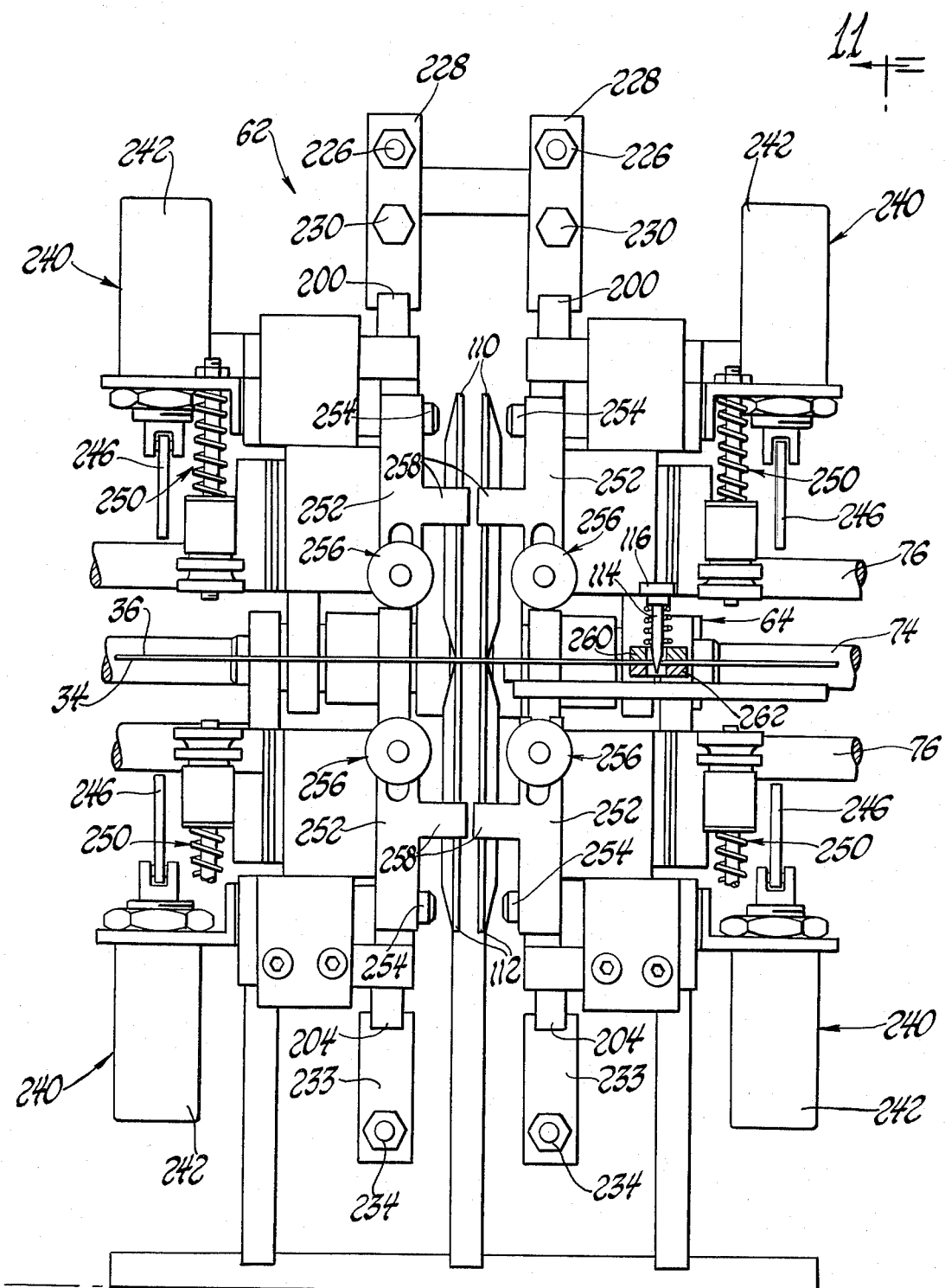
Figure 106:
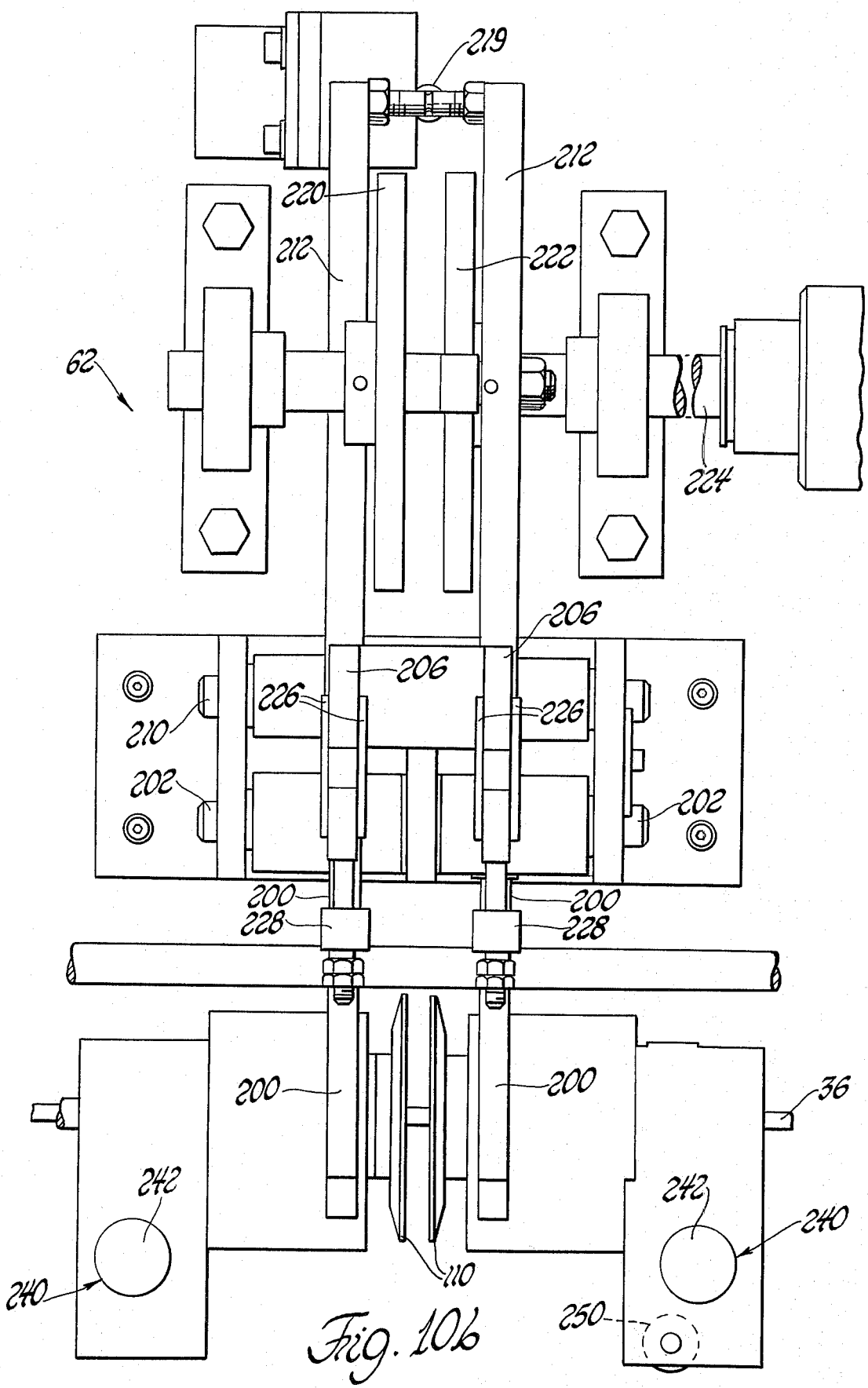

FIGS. 9A through 9E together show a side elevational view of an assembly for assembling the cage retainer after the cage retainer exits from the forming means with FIG. 9A showing the right-hand end of the assembly and FIG. 9E showing the left-hand end;

FIGS. 9A and 9E show the ends of the assembly which include indexing means for indexing the strips through a plurality of stations in successive incremental lengths of movement;

FIG. 9B discloses guide means for guiding the strips into spaced parallel relationship with one another;

FIG. 9C discloses a second station including positioning means for placing roller elements in the pocket portions of one of the strips and guide means for guiding the strips into coextensive abutting relationship with the coacting pocket portions of the strips defining retaining pockets surrounding the roller elements after the roller elements are disposed in the pocket portions of one of the strips;

FIG. 9D shows a third station including alignment members for longitudinally aligning the strips along the lengths thereof to be secured together adjacent a retaining pocket and a securing means comprising welding members for welding the strips together adjacent the retaining pockets therein;

FIG. 10A is a top plan view of that portion of the assembly shown in FIGS. 9A, 9B and 9C.

FIG. 10B is a top plan view of that portion of the assembly shown in FIG. 9D;

FIG. 10C is a top plan view of that portion of the assembly shown in FIG. 9E; and FIG. 11 is a side elevational view taken substantially along line 11—11 of FIG. 9D.

A motion transmitting remote control assembly of the type for transmitting motion in a curved path by a flexible motion transmitting core element is generally shown at 20 in FIG. 1. The remote control assembly 20 includes a conduit 22 with a motion transmitting core element 24 disposed centrally within the conduit 22 for longitudinal movement relative to the conduit 22. The conduit 22 may be any one of various well known types such as wire reinforced plastic, braided wire, or the like. The core element 24 is the well known type comprising a flat metal strip with grooves 26 on the opposite faces thereof and extending longitudinally along the core element. A plurality of roller elements or balls 30 are disposed within the conduit 22 and engage the grooves 26 in the core element 24 for facilitating longitudinal movement of the core element 24 relative to the conduit 22. It will be appreciated that approximately only one-half of the assembly is illustrated and that races defined by longitudinal strips having grooves therein may be disposed between the balls 30 and the conduit 22 so that the balls roll along the races instead of being in rolling engagement with the conduit 22.

A cage retainer means generally indicated at 32 interconnects a plurality of the balls 30 on each side of the core element 24. In other words, although not shown, a cage retainer means 32 extends along the conduit between each side of the core element 24 and the conduit 22. Each retainer cage means 32 includes first and second coextensive and abutting ribbon-like metal strips 34 and 36. The strips 34 and 36 are secured together by spot welds 38 spaced longitudinally along the strips and disposed centrally thereof. The strips 34 and 36 each have pocket portions 40 and 42 respectively which coact together to define ball retaining pockets between the strips for each of the balls 30 whereby one of the balls 30 is rotatably retained in each of the retaining pockets. The pocket portions 40 and 42 are defined by a circular opening 44 and inwardly angled truncated conical flanges surrounding the openings 44 in each of the strips and aligned with one another so that the two openings 44 are aligned, as are the flanges of the opposing strips to define the ball retaining pockets. Each of the openings 44 has a diameter which is slightly larger than the diameter of the balls 30 and the flanges define outwardly disposed openings 46 having a diameter smaller than that of the balls 30.

The cage retainer means 32 also includes alignment means defined by the notches 48 formed in the strips 34 and 36 at longitudinally spaced positions along the strips. More specifically, each notch 48 is disposed in a fixed predetermined relationship to an adjacent ball retaining pocket. Each notch 48 is in the same position along the strips relative to a ball retaining pocket as every other notch is disposed relative to another ball retaining pocket. There are notches 48 along opposite edges of the strips 34 and 36 and in the fixed predetermined relationship to each and every ball retaining pocket. Each notch 48 is aligned and coextensive with a like notch in the opposing strip. Additionally, two aligned and coextensive notches 48 in the respective strips 34 and 36 are transversely aligned across the strips with a like pair of notches on the opposite edge of the strips and the notches are spaced longitudinally along the strips 34 and 36 midway between juxtaposed or next adjacent ball retaining pockets.

FIG. 2 is a side elevational view in schematic form showing an apparatus for assembling the ball cage 32 defined by the coextensive metal strips 34 and 36 having pocket portions 40 and 42 therein for defining ball retaining pockets for rotatably retaining the balls 30 between the strips.

The apparatus includes indexing means generally shown at 50 for simultaneously indexing the pair of strips 34 and 36 successively through a plurality of stations in successive incremental lengths of movement equal to the distance between the centers of the longitudinally spaced ball retaining pockets, as will be apparent hereinafter. The incremental lengths of movement of the strips 34 and 36 may be distances equal to successive or next adjacent ball retaining pockets or may be any multiple thereof, depending upon the configuration of the other components in the apparatus.

The apparatus also includes a forming means generally shown at 52 for simultaneously forming the pocket portions 40 and 42 and the notches 48 defining the alignment means adjacent the pocket portions 40 and 42 in each of the strips 34 and 36 at a first station in the apparatus. The strips 34 and 36 are unwound from separate coils of metal strips and are fed into the forming means 52 in laterally spaced and parallel relationship to one another. The apparatus includes a guide post generally indicated at 54 for maintaining the strips 34 and 36 in laterally spaced and parallel relationship to one another and a subsequent guide assembly, generally indicated at 56, for maintaining the strips 34 and 36 vertically spaced from one another.

The apparatus also includes a ball loading means generally shown at 58 through which the first or lower strip 34 and the second or upper strip 36 passes through for placing balls 30 in the pocket portions 40 of the first strip 34, the ball loading means being at a second station. The ball loading means 58 may take one of various different configurations. For example, the ball loading means 58 may be of the type disclosed in U.S. Pat. No. 3,831,249 granted Aug. 27, 1974 in the names of Sheldon E. Perlman and John C. Ion and assigned to the assignee of the subject application.

The assembly also includes guide means generally shown at 60 for guiding the strips 34 and 36 into coextensive abutting relationship with the coating pocket portions 40 and 42 defining the ball retaining pocket surrounding the balls 30. In other words, the guide means 60 guides the upper strip 36 into coextensive overlapping relationship with the lower strip 34 whereby the strip 36 is immediately above the strip 34. The guide means 60 guides the strips 34 and 36 subsequent to the first or lower strip 34 moving away from the ball loading means 58.

The apparatus also includes a securing means positioned at a third station and generally shown at 62 for successively securing the strips together adjacent each ball retaining pocket therein.

Also included at the third station is positioning means generally shown at 64 for successively longitudinally aligning the strips 34 and 36 along the length thereof having the ball retaining pocket adjacent which the strips are secured together prior to and during the securing of the strips 34 and 36 together by the securing means 62.

Also included is a sensing means comprising a light source 66 and a photocell 68 for sensing the absence of a ball in each pocket portion 40 of the first or lower strips 34 after the strip 34 moves away from the ball loading means 58.

Although not totally or specifically illustrated, appropriate control means including micro switches, cams, etc., are included for controlling and sequencing the indexing means 50, the forming means 52, the securing means 62, and the positioning means 64 for indexing the movement of the strips 34 and 36 through the stations in successive incremental lengths of movement between stopped positions of the strips 34 and 36, which lengths are equal to the distance between the centers of longitudinally spaced pocket portions 40 and 42, and for actuating the forming means 52, the securing means 62 and the positioning means 64 while the strips 34 and 36 are in the stopped positions between the incremental lengths of movement. Included in the indexing means 50 is an eliptical cam 70 which engages a cam follower 72 for longitudinally moving a movable rod 74. The cam 70 is eliptical thereby oscillating the movable rod 74 back and forth during rotating movement of the cam 70. The indexing means 50 also includes the stationary rods 76 fixed to and supported by posts 78 and 80, the movable rod being slidably supported by posts including post 80.

The movable rod 74 and stationary or fixed rods 76 extend longitudinally along the apparatus in parallel spaced relationship to one another. The indexing means 50 includes first and second movable clamping means defined by the clamping units 82 and 84 which are rigidly fixed to the movable rod 74 for selectively clamping the strips 34 and 36. The clamping units 82 and 84 comprise upper and lower clamps spring biased together into engagement with the strips and are solenoid or air actuated. The clamping unit 84 has two parallel paths extending therethrough for clamping the strips 34 and 36 in laterally spaced parallel relationships. The clamping unit 82, however, has one clamping passage extending therethrough as the strips 34 and 36 are in coextensive overlapping and abutting relationship with one another as they pass therethrough. Also included in the indexing means are first and second stationary clamping means defined by the clamping units 86 and 88 which are fixed in a stationary manner to the stationary rods 76 for selectively clamping the strips 34 and 36. The clamping unit 88 has two parallel passages for clamping the strips in laterally spaced parallel relationship whereas the clamping unit 86 has a single passage therethrough for clamping the strips when they are disposed together. The movable clamping unit 84 and the fixed clamping unit 88 are positioned between the forming means 52, which is at the first station, and the ball loading means 58, which is at the second station. The movable clamping unit 82 and the fixed stationary clamping unit 86 are positioned downstream of the securing means 62 which is at the third station. After the strips leave the clamping unit 86 they may be coiled upon a storage coil not shown.

The control means (not shown) includes a sequencing means including micro switches etc., for actuating the movable clamping units 82 and 84 to clamp the strips 34 and 36 during the incremental movement of the strips between stopped positions and for actuating the stationary clamping units 86 and 88 to clamp the strips 34 and 36 in each stopped position of the strips. The control means also controls rotation of the cam 70 which defines an oscillating means for longitudinally oscillating the movable rod 74 for incrementally moving the strips 34 and 36 between the stopped positions.

There is also included a guide 90 downstream of the fixed clamping unit 88 for maintaining the strips 34 and 36 in laterally spaced parallel relationship to one another.

The forming means 52 comprises lower and upper die components or sets generally indicated at 92 and 94 respectively. The die sets 92 and 94 are movable vertically relative to one another by actuators 96 which may be pneumatic or hydraulic and sequenced by the control means. The die sets 92 and 94 include first and second laterally spaced and parallel guide passages for guiding the first strip 34 through the first guide passage and the second strip 36 through the second guide passage. The forming means includes severing means comprising a pair of notching punches 98 disposed on each side or along each edge of each of the guide passages extending through the die sets for severing away a piece of each strip for making the notches 48 in each side or edge of each strip while the strips are in each stopped position. FIG. 3 shows the strip 34 in a stopped position with the notching punches 98 shown in cross section in the position where the punches 98 have severed pieces from the strip 34 to define the notches 48.

The forming means 52 also includes piercing means comprising the piercing punches 100, one of which is disposed over or transversely to each guide passage and consequently each strip 34 and 36, for piercing or forming holes 102 through the strips 34 and 36 in each stopped position to define the position of the pocket portions 40 and 42 in the strips 34 and 36. The notching punches 98 and the piercing punches 100 are supported by the upper die set 94 and as the upper and lower die sets 92 and 94 come together the punches 98 and 100 are moved downwardly to engage and notch and pierce the respective strips. The punches 98 and 100 move downwardly so that they engage the strips simultaneously while the strips are in a stopped position whereby the notches 48 are formed simultaneously with the holes 102 to precisely position the holes 102 relative to the notches 48, and vice versa.

The forming means also include extruding means comprising the extruding punches 103 and 105 disposed to extend transversely to the respective guide passages for extruding the truncated conical flanges at each of the holes 102 for defining the pocket portions 40 and 42 respectively. The extruding punch 103 is attached to the upper die set 94 and moves downwardly to form the pocket portions 40 in the lower strip 34 whereas the extruding punch 105 is attached to the lower die set 92 and moves upwardly to form the pocket portions 42 in the upper strip 36. In other words, the extruding punches 103 and 105 extrude the strips 34 and 36 about each of the holes 102 formed therein while the strips are in a stopped position but subsequent to a stopped position in which the holes 102 and the notches 48 are formed in the strips. The actuators 96 define actuation means for simultaneously actuating the forming means defined by the punches 98, 100 and 103.

The forming means also includes pilot means for engaging the holes 102 in the strips at a position between the piercing punch 100 and the extruding punch 103 and also for engaging the notches 48 to position the strips in each stopped position in the forming means 52. More specifically, the pilot means comprises a plurality of tapered pilot pins 104 and 106 with the pilot pins 104 engaging the holes 102 and the pilot pins 106 engaging the notches 48.

As shown in FIG. 3, there is also included a biasing means comprising a detent locator 108 for engaging the notches 48 and for urging the strips laterally in the same direction against the respective lateral extremities of the guide passages extending therethrough. In other words, the detent locator 108 is biased in a direction against the strip 34 as shown in FIG. 3 to urge the strip 34 against the edge of the guide passageway extending through the die sets 92 and 94.

The securing means 62 includes spot welders defined by an upper pair of welding wheels 110 and a lower pair of welding wheels 112 for engaging the abutting strips 34 and 36 at the third station for spot welding the strips together as shown at 38 in each stopped position of the strips 34 and 36. The upper pair of welding wheels 110 are spaced from one another longitudinally of the strips above the strips 34 and 36 and in a similar fashion the lower pair of welding wheels 112 are spaced from one another longitudinally of the strips but below the strips 34 and 36. The control means includes means for moving the welding wheels 110 and 112 vertically into engagement with the strips 34 and 36.

The positioning means 64 includes a pair of tapered members 114 on each side or along each edge of the abutting strips 34 and 36 at the third station for engaging and aligning the notches 48 on opposite sides of the strips in each stopped position of the strips 34 and 36. The tapered members or pins 114 are spring biased upwardly and have a top engaged by a portion 116 attached to the support for one of the upper welding wheels 110 whereby when the upper welding wheels 110 are moved downwardly to engage the strips, the pins 114 are moved downwardly to engage the notches 48 on each side of the strips so that the length of the strips adjacent the notches are aligned to align the pocket portions 40 and 42 of the pocket adjacent which the strips are welded together. The welding wheels 110 and 112 are spaced apart so as to engage the strips on opposite sides of each of the retaining pockets to spot weld the strips together at 38 on each side of each retaining pocket defined by the pocket portions 40 and 42.

To summarize the overall operation, a pair of ribbon-like metal strips 34 and 36 pass in parallel relationship through the forming means 52 and when the strips 34 and 36 are in a stopped position the die sets 92 and 94 are moved together whereby the notches 48 defining the alignment means and the holes 102 for positioning the pocket portions 40 and 42 are simultaneously formed by the notching punches 98 and the piercing punches 100. The apparatus is then sequenced by the control means whereby the movable clamping units 82 and 84 clamp the strips and move the strips an incremental distance which is equal to the distance between adjacent holes 102 or adjacent retaining pockets as defined by the pocket portions 40 and 42. Once the strips have been moved the incremental distance, the stationary clamping units 86 and 88 clamp the strips and the movable clamping units 82 and 84 release the strips and are moved back to the right upon rotation of the cam 70. The detent locator 108 urges the strip laterally against the side of the guide passage and the upper and lower die sets 92 and 94 are again actuated and the pilot pins 104 and 106 engage the hole 102 and the notches 48 to position the strips accurately as the next adjacent hole 102 and notches 48 are formed. The indexing means 50 is then again sequenced to move the strips forward incrementally and the same operation occurs with the extruding punches 103 and 105 engaging the strips at the holes 102 for extruding the pocket portions 40 and 42 therein. The strips are thus successively moved incremental distances between stopped positions and extend through the guides 90 and 94 in parallel spaced relationship to one another. The guide 56 separates the strips vertically whereby the lower strip 34 passes through the ball loading means 58 to have balls placed in the pocket portions 40 thereof. As the lower strip 34 leaves the ball loading means 58, the sensing means comprising the light source 66 and photocell 68 determine the absence of a ball in the pocket portions 40 of the lower strip 34. The strips 34 and 36 then pass through another guide 60 which disposes the strips in abutting, overlapping and coextensive relationship with one another. During each actuation of the die sets 92 and 94, the welding wheels 110 and 112 are moved toward one another whereby the tapered pins 114 engage the notches 48 in the strips to perfectly align and make coextensive the notches 48 on the opposite sides of the strips 34 and 36 thereby longitudinally aligning the lengths of the strips between the welding wheels 110 and 112 whereby the pocket portions 40 and 42 are perfectly aligned and are welded in position as the welding wheels 110 and 112 engage the strips. Thus, the strips are successively secured together adjacent or on opposite sides of each ball retaining pocket and are successively longitudinally aligned along the length thereof having the ball retaining pocket adjacent which the strips are welded together prior to and during the welding of the strips together by the welding wheels 110 and 112. Said another way, the notches 48 defining the alignment means are formed in the strips in predetermined longitudinal relationship to the pocket portions 40 and 42 therein and the strips are longitudinally aligned by the tapered pins 114 as the tapered pins 114 align the notches of the respective strips adjacent each ball retaining pocket or each time the strips are welded together. The tapered members or pins 114 are moved transversely of the strips 34 and 36 and into engagement with the strips in the areas or notches 48 where the pieces have been severed therefrom.

It will be understood that the various stations or components of the apparatus may be further separated from one another or further combined. Further, the notches 48 may be formed longitudinally ahead of the holes 102 instead of behind as shown. The successive aligning of the notches 48 adjacent each pocket includes the alignment of notches 48 longitudinally spaced from the pocket portions being welded by other notches 48, i.e., it need not be the very next adjacent notch to the pocket being welded.

Figure 4:
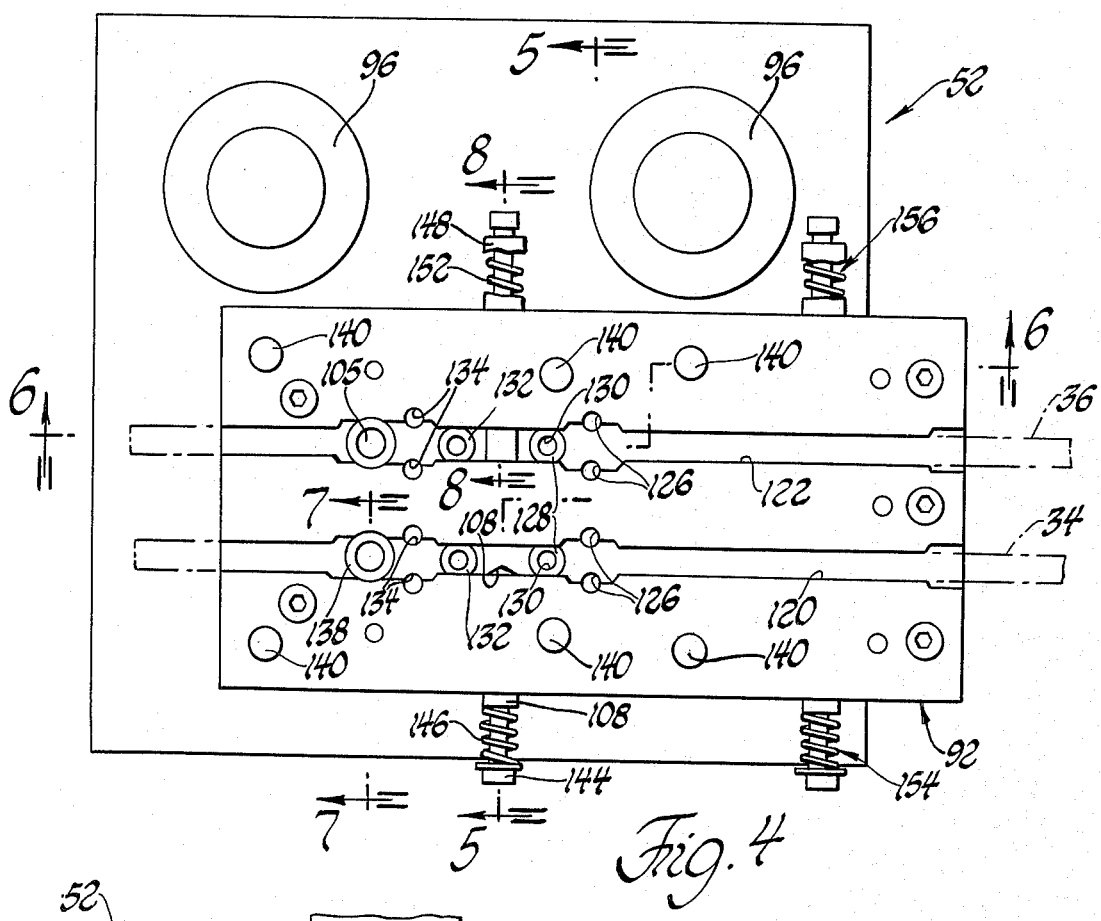
FIG. 4 is a plan view showing the lower die component of the forming means and is taken substantially along line 4—4 of FIG. 6.
Figure 5:
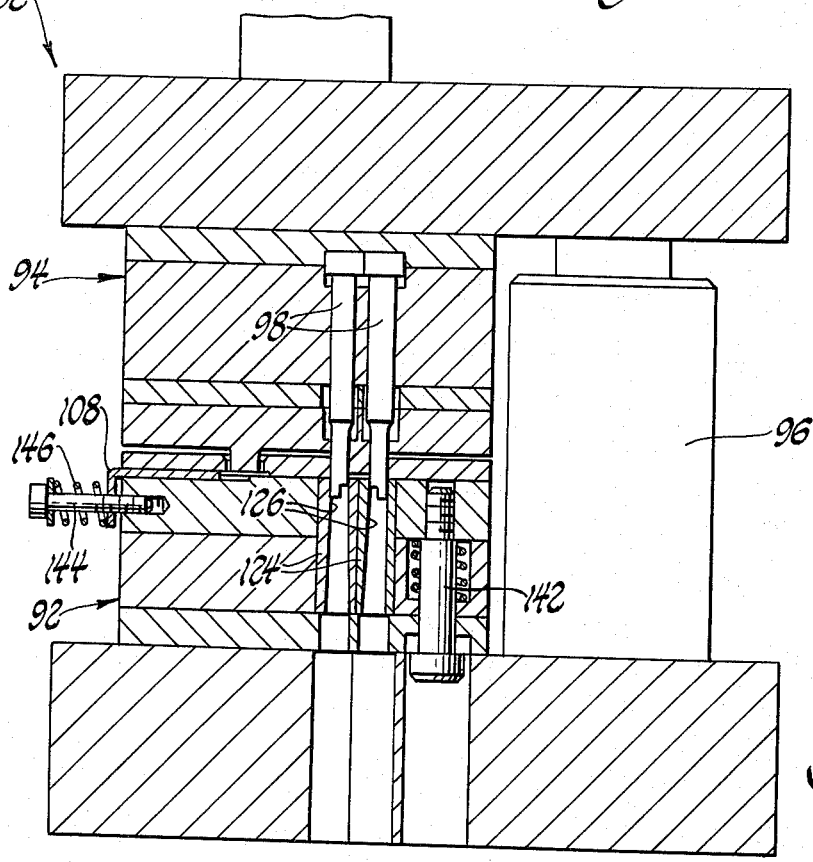
FIG. 5 is a cross-sectional view of both the upper and lower die components in the forming means and taken substantially along line 5—5 of FIG. 4.

The forming means including the upper and lower die sets 192 and 94 are more specifically disclosed in FIGS. 4 through 8. FIG. 4 is a plan view of the lower die set and shows the guide passages 120 and 122 through which the strips 34 and 36 extend and are guided. The lower die set 92 includes the female receiving insert or female portions 124 for receiving the notching punches 98 as the female portions 124 have receiving apertures 126, the top edge of which define a cutting or shearing edge with the bottom portion of the punches 98.

The lower die set 92 also includes the receiving inserts or female portions 128 having apertures or holes 130 for receiving the piercing punches 100 with the upper extremities of the apertures 130 defining cutting edges with the lower extremities of the punches 100. In a similar fashion the lower die set includes female inserts 132 and 134 for receiving the guide pins 104 and 106 respectively. The lower die set 192 supports the extruding punch 105 which engages a female die portion 136 supported by the upper die set 94 for extruding the strips 36 about the holes 102 therein to form the pocket portions 42. In a similar fashion, the upper die set 94 supports the extruding punch 103 which engages a female extruding die 138 supported by the lower die set 92 for extruding the strip 34 about the holes 102 therein to define the pocket portions 40.

The die sets include guide or assembly pins 140 and 142 for maintaining the components thereof aligned and assembled during operation of the forming means 52.

As alluded to above, the forming means 52 also include biasing means for urging the respective strips 34 and 36 against the sides of the passages 120 and 122. Of these biasing means two are detent locators for engaging the notches 48 on one side of each of the strips for urging the strips laterally in the same direction. The detent locator 108 is an L-shaped metal strip supported on a bolt 144 with a spring 146 urging the member 108 into engagement with the strip 34. A like locator detent for coacting with the notches 48 in the strip 36 is shown in FIG. 8 at 148. The member 148 is disposed beneath the strip 36 and includes a tongue 150 for engaging the notches 48 on the inside edge of the strip 36. The member 148 is biased outwardly by a spring 152. The tongue 50 has an arcuate or pointed end like that of the detent locator 108 for engaging the notches 48.

The biasing means also includes the locators generally indicated at 154 and 156 which coact with the edges of the strips 34 and 36 respectively in the same fashion as the detent locators 108 and 148 except for the fact that the ends thereof are blunted to engage the edges of the strips 34 and 36 before the notches are formed therein. The importance of biasing the strips against the extremities of the guide passages 120 and 122 is to always have a firm fixed position for the strips whereby the tolerances are eliminated or minimized transversely of the strips.

Turning now to the indexing means 50, as shown in FIGS. 9A and 9E, the clamping units 82, 84, 86 and 88 include upper and lower clamping members 157 and 158 which are biased toward one another or to the clamping position by the springs 160. As alluded to above, the upper and lower clamping members 157 and 158 of each clamping unit are moved out of clamping position by an air actuated cylinder which is controlled by the control means and returned by the springs 160.

Referring now to FIGS. 9E and 10C, a spring 162 is disposed about the movable rod 74 and reacts between the support post 80 and a collar 164 secured to the rod 74 to urge the cam follower 72 into engagement with the cam 70. Said another way, the spring 162 urges the movable rod 74 to the right. The cam 70 is rotated through a gear box generally shown at 166 which is, in turn, driven through a shaft 168 from a main drive source or motor. An intermediate support 170 supports the rods 74 and 76 intermediate the lengths thereof as it is fixed to the stationary rods 76 and slidably supports the movable rod 74.

There is also included an adjustment means generally indicated at 172 in FIG. 9E for longitudinally positioning the post 80 and the rods 74 and 76 for adjusting the longitudinal position of the clamping units.

Turning now to FIG. 10A, the guide 56 includes a plate 174 associated with each strip and supporting a pair of rollers 176 thereon which engage opposite edges of the strips. The rollers 176 are shown engaging a strip 36' which illustrates the maximum width of the strip which is appreciably greater than the strip 36. In other words, the apparatus may accommodate strips of various widths and the strips 34' and 36' as shown in FIG. 10A illustrate the wider width. Another guide means generally indicated at 178 in FIG. 10C also includes a pair of rollers engaging opposite edges of the strips after the strips are in abutting overlapping relationship with one another.

As alluded to above, the ball loading or hopper means 58 may take one of numerous well known forms and after the lower strip 34 exits from the ball loading means 58 it passes beneath a spring biased guide plate 180 which is biased downwardly by the stud spring assemblies 182 to retain the balls 30 in the pocket portions 40 of the strip 34. Thereafter, the strips 34 pass through the guide means 60 which dispose the strips in coextensive overlapping relationship with one another prior to entering the welding and alignment station.

The welding and alignment station is shown in FIGS. 9D, 10B and 11.

The upper welding wheels 110 are rotatably supported by lever means comprising the lever arms 200 which are pivotally supported on the pivot shaft 202. In a similar fashion, the lower welding wheels 112 are rotatably supported on lever means defined by the lever arms 204 which are also pivotally supported on the shaft 202. A pair of arms 206 and 208 are pivotally supported on a shaft 210 and include cam follower arms 212 and 214 extending therefrom. The cam follower arms 212 and 214 support cam followers 216 and 218 respectively. The cam follower 218 rides upon a cam 220 and cam follower 216 engages a cam 222. The arms 212 and 214 are urged together by a spring 219 which urges the cam followers 216 and 218 against their respective cams. The cams 220 and 222 are rotated through rotary movement from a shaft 224. The arm 206 is connected to the respective lever arms 200 through bracket assemblies 226 and posts 228 which extend from the lever arms 200 and spring biased assemblies 230 to provide lost motion between the arms 206 and the lever arms 200. Each of the lever arms 200 is independently pivotally supported on the shaft 202.

The lower lever arms 204 are connected to the arms 208 through posts 232 and bracket assemblies 234. Each of the levers 204 is independently pivotally supported on the shaft 202 whereby the lower welding wheels 112 may move relative to one another.

There is also included dialing means generally shown at 240 for selectively rotating the welding wheels 110 and 112 when the wheels are out of engagement with the strips 34 and 36 so that each successive welding operation takes place at a different peripheral location about the welding wheels 110 and 112. Each dialing means includes an actuator 242 which, in turn, pivots a lever 244 through a link 246 to actuate a ratchet mechanism generally indicated at 248 in FIG. 11 for indexing or rotating the respective wheels 110 and 112. A spring assembly generally indicated at 250 returns the levers 244 when they are moved toward the actuators 242 upon actuation of the actuators 242.

The welding assembly also includes pivotally supported arms 252 pivotally supported on the shafts 254 and biased towards the wheel by spring assemblies 256 for supporting welding wheel cleaning or scraping means on the projecting portions 258 for cleaning the welding wheels 110 and 112 as they are rotated.

As decribed above, the positioning means 64 includes tapered pin members 114 which are spring biased upwardly against the member 116 which moves with the lever arms 200 to force the tapered pins downwardly through a guide member 260 and into a female receiving member 262. The tapered pins 114 are disposed on either side of the strips 34 and 36 for aligning the notches therein so that the notches are coextensive with one another to align the longitudinal lengths of the strips which are disposed between the upper and lower welding wheels 110 and 112 prior to and during the spot welding thereof so that the pocket portions 40 and 42 of the respective strips are aligned with one another prior to the strips being secured together by welding.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A method of assembling a ball cage of the type including a pair of coextensive strips having pocket portions defining ball retaining pockets having openings therein for rotatably retaining balls between the strips while exposing the balls and utilized in a conduit of a motion transmitting remote control assembly for facilitating the movement of a motion transmitting core element therein, said method comprising; simultaneously indexing the pair of strips successively through at least one station, forming the pocket portions in each of the strips, securing the strips together adjacent different ball retaining pockets with balls therein each time the strips are indexed, and longitudinally aligning the strips along the length thereof having the ball retaining pocket adjacent which the strips are secured together prior to and during the securing of the strips together by said securing means and aligning such lengths each time the strips are indexed.

2. A method as set forth in claim 1 including forming alignment means in each of said strips in predetermined longitudinal relationship to each pocket portion therein, and wherein the longitudinally aligning of the strips is further defined as aligning the alignment means of the respective strips adjacent each pocket thereof.

3. A method as set forth in claim 2 wherein the securing of the strips together is further defined as securing the strips together at longitudinally spaced positions disposed on either side of each pocket therein.

4. A method as set forth in claim 2 including placing balls in the pocket portions of a first of the strips.

5. A method as set forth in claim 4 including sensing whether each pocket portion of the first strip has a ball disposed therein.

6. A method as set forth in claim 2 further defined as simultaneously forming the pocket portions and alignment means in each strip.

7. A method as set forth in claim 6 wherein the forming of the alignment means is further defined as severing away a piece of each strip adjacent each pocket portion therein.

8. A method as set forth in claim 7 wherein the alignment of the alignment means is further defined as moving a tapered member transversely of the strips and into engagement with the strips in the areas where the pieces have been severed therefrom.

9. A method as set forth in claim 8 wherein said securing means is further defined as moving welding means into engagement with the strips while the tapered member is in engagement with the strips for aligning the adjacent pocket portions thereof.

10. A method of assembling a ball cage of the type including a pair of coextensive metal strips having pocket portions defining ball retaining pockets for rotatably retaining balls between the strips, the method including the steps of; simultaneously indexing the pair of strips successively through a plurality of stations, simultaneously forming the pocket portions and alignment means adjacent the pocket portions in each of the strips at a first station, positioning balls adjacent a first of the strips at a second station for placing balls in the pocket portions thereof, guiding the strips into coextensive abutting relationship with coacting pocket portions thereof defining the ball retaining pockets surrounding the balls therein subsequent to the first strip moving away from the second station, securing the strips together at a third station by securing the strips together adjacent the aligned pocket portions defining the adjacent ball retaining pocket, and aligning the alignment means at the third station for longitudinally aligning the strips along the length thereof having the ball retaining pocket adjacent which the strips are secured together prior to and during the securing of the strips together.

11. A method as set forth in claim 10 wherein the indexing of the strips is further defined as indexing the strips through the stations in successive incremental lengths of movement equal to the distance between the centers of longitudinally spaced pocket portions therein.

12. A method as set forth in claim 11 including the step of sensing whether each pocket portion of the first strip has a ball disposed therein prior to moving the strips into abutting relationship.

13. A method of assembling a ball cage of the type including a pair of coextensive strips having pocket portions defining ball retaining pockets having openings therein for rotatably retaining balls between the strips while exposing the balls and utilized in a conduit of a motion transmitting remote control assembly for facilitating the movement of a motion transmitting core element therein, the method including the steps of; simultaneously indexing the pair of strips successively through at least one station, forming alignment means in each of said strips at longitudinally spaced positions along the strips and in predetermined longitudinal relationship to the pocket portions therein each time the strips are indexed, longitudinally aligning lengths of the strips adjacent each alignment means by longitudinally aligning adjacent alignment means of the strips each time the strips are indexed, and securing the strips together at least at one position along the adjacent lengths while the adjacent lengths are maintained in longitudinal alignment each time the strips are indexed.

14. An apparatus for assembling a ball cage of the type including a pair of coextensive strips having pocket portions defining ball retaining pockets for rotatably retaining balls between the strips and utilized in a conduit of a motion transmitting remote control assembly for facilitating the movement of a motion transmitting core element therein, said apparatus comprising; guide means laterally positioning the strips in coextensive and overlapping alignment, indexing means for simultaneously indexing the pair of strips through at least one station, securing means for successively securing the strips together adjacent each ball retaining pocket each time the strips are indexed, and positioning means for successively longitudinally aligning the strips along the length thereof having said ball retaining pocket adjacent which the strips are secured together prior to and during the securing of the strips together by said securing means each time the strips are indexed by said indexing means.

15. An apparatus as set forth in claim 14 including first forming means for forming alignment means in each of the strips in predetermined longitudinal relationship to each pocket portion therein, and wherein said positioning means coacts with the alignment means in the respective strips for longitudinally aligning the alignment means of the strips adjacent each pocket thereof.

16. An apparatus as set forth in claim 15 wherein said securing means includes a plurality of welding means for securing the strips together at longitudinally spaced positions disposed on either side of each pocket.

17. An apparatus as set forth in claim 15 including second forming means for forming the pocket portions in each of the strips.

18. An apparatus as set forth in claim 17 including ball loading means for placing balls in the pocket portions of a first of the strips.

19. An apparatus as set forth in claim 18 including sensing means for sensing the absence of a ball in each pocket portion of the first strip after the first strip moves away from said ball loading means.

20. An apparatus as set forth in claim 17 including first actuation means for simultaneously actuating said first and second forming means for simultaneously forming said pocket portions and the alignment means.

21. An apparatus as set forth in claim 20 including second actuation means for moving said positioning means into engagement with said alignment means and moving said securing means into engagement with the strips while said positioning means is in engagement with said alignment means and thereafter removing said positioning means and said securing means.

22. An apparatus as set forth in claim 21 wherein said first forming means comprises a severing device for severing away a piece of each strip adjacent each pocket portion therein.

23. An apparatus as set forth in claim 22 wherein said positioning means includes a tapered member extending transversely to the width of the strips for engaging the strips in the areas where the pieces have been severed therefrom.

24. An apparatus for assembling a ball cage of the type including a pair of coextensive metal strips having pocket portions defining ball retaining pockets for rotatably retaining balls between the strips, said apparatus comprising; indexing means for simultaneously indexing the pair of strips successively through a plurality of stations, forming means for simultaneously forming the pocket portions and alignment means adjacent the pocket portions in each of the strips at a first station, ball loading means for placing balls in the pocket portions of a first of the strips at a second station, first guide means for guiding the strips into coextensive abutting relationship with coacting pocket portions thereof defining the ball retaining pockets surrounding the balls therein subsequent to the first strip moving away from said ball loading means, securing means at a third station for successively securing the strips together adjacent each ball retaining pocket, and positioning means for successively longitudinally aligning the strips along the length thereof having said ball retaining pocket adjacent which the strips are secured together prior to and during the securing of the strips together by said securing means at said third station.

25. An apparatus as set forth in claim 24 including control means for sequencing said indexing means for indexing the movement of the strips through said stations in successive incremental lengths of movement equal to the distance between the centers of longitudinally spaced pocket portions therein.

26. An apparatus as set forth in claim 24 including control means for controlling and sequencing said indexing means, said forming means, said securing means and said positioning means for indexing the movement of the strips through said stations in successive incremental lengths of movement between stopped positions which lengths are equal to the distance between the centers of longitudinally spaced pocket portions therein and for actuating said forming means, said securing means and said positioning means while the strips are in the stopped positions between said incremental lengths of movement.

27. An apparatus as set forth in claim 26 including sensing means for sensing the absence of a ball in each pocket portion of the first strip after the first strip moves away from said ball loading means.

28. An apparatus as set forth in claim 26 wherein said forming means includes first and second laterally spaced and parallel guide passages for guiding a first of the strips through the first guide passage and the second of the strips through the second guide passage, severing means for severing away a piece of each strip to define the alignment means, and piercing means for forming holes through the strips to position the pocket portions therein, said severing means and said piercing means engaging the strips simultaneously while the strips are in a stopped position.

29. An apparatus as set forth in claim 28 including biasing means for urging the strips laterally in the same direction against the respective lateral extremities of said guide passages.

30. An apparatus as set forth in claim 29 wherein said forming means further includes extruding means for extruding the strips about each of the holes formed therein while the strips are in a stopped position subsequent to the stopped position in which the holes are formed by said piercing means for defining the pocket portions therein.

31. An apparatus as set forth in claim 30 wherein said forming means further includes pilot means for engaging the holes in the strips between said piercing means and said extruding means for positioning the strips in each stopped position in said forming means.

32. An apparatus as set forth in claim 30, wherein said forming means further includes pilot means for engaging the holes in the strips between said piercing means and said extruding means and for engaging the alignment means for positioning the strips in each stopped position in said forming means.

33. An apparatus as set forth in claim 32 wherein said severing means comprises a pair of notching punches disposed on each side of each of said guide passages for making a notch in each side of each strip in each stopped position, said piercing means comprises a piercing punch disposed transversely to each guide passage for piercing a hole in each strip in each stopped position, said extruding means comprises an extruding punch disposed transversely to each guide passage for extruding a truncated-conical flange at each hole for defining the pocket portion therein, said pilot means comprises a plurality of tapered pilot pins for engaging the holes and notches in the strips.

34. An apparatus as set forth in claim 33 wherein said biasing means includes a detent locator for engaging the notches on like sides of the strips.

35. An apparatus as set forth in claim 32 wherein said positioning means includes a tapered member on each side of the abutting strips at the third station for engaging and aligning the notches on opposite sides of the strips in each stopped position of the strips.

36. An apparatus as set forth in claim 35 wherein said securing means includes spot welders for engaging the abutting strips at the third station for spot welding the strips together in each stopped position of the strips.

37. An apparatus as set forth in claim 36 wherein said spot welders comprise an upper pair of welding wheels spaced from one another longitudinally of the strips above the strips and a lower pair of welding wheels spaced from one another longitudinally of the strips below the strips.

38. An apparatus as set forth in claim 37 including first lever means rotatably supporting said upper welding wheels, second lever means rotatably supporting said lower welding wheels, and pivot means for pivotally supporting said first and second lever means for allowing oscillating movement of said welding wheels into and out of engagement with the strips.

39. An apparatus as set forth in claim 38 including cam means operatively associated with said first and second lever means for oscillating said first and second lever means.

40. An apparatus as set forth in claim 39 including dialing means for selectively rotating said welding wheels when said wheels are out of engagement with the strips.

41. An apparatus as set forth in claim 27 wherein said indexing means includes at least one stationary rod extending along said apparatus, at least one longitudinally movable rod extending along said apparatus, first and second movable clamping means fixed to said movable rod for selectively clamping the strips, first and second stationary clamping means fixed to said stationary rod for selectively clamping the strips, said first movable clamping means and said first stationary clamping means being positioned between said forming means at said first station and said ball loading means at said second station, said second movable clamping means and said second stationary clamping means being positioned downstream of said securing means at said third station, said control means including sequencing means for actuating said movable clamping means to clamp the strips during the incremental movement thereof between stopped positions and for actuating said stationary clamping means to clamp the strips in each stopped position of the strips, and oscillating means for longitudinally oscillating said movable rod for incrementally moving the strips between the stopped positions.

* * * * *